(12) United States Patent
Wang

(10) Patent No.: US 11,416,025 B2
(45) Date of Patent: Aug. 16, 2022

(54) PROTECTIVE CASE WITH ELECTRONIC FUNCTION

(71) Applicant: Jiao Wang, Sichuan (CN)

(72) Inventor: Jiao Wang, Sichuan (CN)

( * ) Notice: Subject to any disclaimer, the term of this patent is extended or adjusted under 35 U.S.C. 154(b) by 468 days.

(21) Appl. No.: 16/740,498

(22) Filed: Jan. 13, 2020

(65) Prior Publication Data

US 2020/0150720 A1 May 14, 2020

(30) Foreign Application Priority Data

Dec. 31, 2019 (CN) .......................... 201911410789.7

(51) Int. Cl.
*G06F 1/16* (2006.01)
*H04N 21/4363* (2011.01)

(52) U.S. Cl.
CPC .......... *G06F 1/1628* (2013.01); *G06F 1/1656* (2013.01); *G06F 1/1669* (2013.01); *H04N 21/43635* (2013.01); *G06F 2200/1633* (2013.01)

(58) Field of Classification Search
CPC .... G06F 1/1628; G06F 1/1632; G06F 1/1656; G06F 1/1654; G06F 1/1669; G06F 1/181; G06F 13/14; G06F 2200/1633; A45C 11/00; H04N 21/43635
See application file for complete search history.

(56) References Cited

U.S. PATENT DOCUMENTS

| | | | | |
|---|---|---|---|---|
| 2011/0199727 A1* | 8/2011 | Probst | ................... | G06F 1/1628 361/679.09 |
| 2012/0268911 A1* | 10/2012 | Lin | ....................... | G06F 1/1669 361/807 |
| 2013/0016467 A1* | 1/2013 | Ku | ........................ | F16M 11/10 361/679.08 |
| 2014/0207924 A1* | 7/2014 | Roper | ................... | H04L 41/082 709/221 |
| 2014/0215114 A1* | 7/2014 | Chow | .................... | G06F 13/14 710/303 |
| 2014/0253047 A1* | 9/2014 | Horie | .................... | H02J 7/0071 320/150 |
| 2014/0285962 A1* | 9/2014 | Staats | ................... | G06F 1/1616 361/679.43 |
| 2015/0169039 A1* | 6/2015 | Teshima | ................ | G06F 1/1698 713/324 |
| 2016/0026221 A1* | 1/2016 | Lee | ........................ | G06F 1/1618 361/679.29 |
| 2016/0048173 A1* | 2/2016 | Lyles | .................... | G06F 1/1632 361/679.17 |
| 2016/0139635 A1* | 5/2016 | Gibson | ................. | G06F 1/1616 361/679.55 |
| 2016/0154473 A1* | 6/2016 | Yato | ...................... | G06F 1/1632 345/156 |
| 2020/0319679 A1* | 10/2020 | Knoppert | .............. | G06F 1/1641 |

* cited by examiner

*Primary Examiner* — Adrian S Wilson
*Assistant Examiner* — Gage Crum

(57) ABSTRACT

The present disclosure relates to the field of tablet computer accessories, and in particular, to a protective case with an electronic function. The protective case with an electronic function according to the present disclosure provides a tablet with more extension functions, which can not only protect a tablet computer but also add functions to the tablet computer. Moreover, the protective case is further electrically connected to a corresponding external keyboard by magnetic adsorption, which is convenient to use and changes the tablet into a portable mini-laptop, which is especially suitable for mobile officing.

10 Claims, 4 Drawing Sheets

PROTECTIVE CASE WITH ELECTRONIC FUNCTION

BACKGROUND OF THE INVENTION

The present disclosure relates to the field of tablet computer accessories, and in particular, to a protective case with an electronic function.

Tablet computers have increasingly come into people's life, bringing people a lot of life convenience. For example, people can use mobile terminals to listen to music, watch videos or do simple office work anytime and anywhere. In order to avoid that the tablet computer accidentally falls or collides and rubs with other items to cause damage when carried or used, many people will provide a protective cover outside the tablet computer to achieve a protection effect.

However, the existing tablet computer only has one interface to complete data transmission and charging, so than charging and audio data receiving or other data transmission cannot be performed simultaneously. Moreover, the existing tablet computer is provided with a limited number of interfaces and the direct use of data lines for connection and conversion results in inconvenient use and easy twining, which not only affects the appearance, but also is not easy to store and carry, bringing bad use experience to users. In addition, the existing tablet protective case has no other electronic functions except for the function of protecting the tablet, thus only has a single function.

BRIEF SUMMARY OF THE INVENTION

To solve the above problem, the present disclosure aims at providing a protective case with an electronic function, which not only can protect a tablet but also has a function of extending an electronic function of the tablet.

In order to realize the above purpose, the present disclosure adopts the following technical scheme: a protective case with an electronic function, comprising a case body, a tablet connection port and an extension module, wherein the case body comprises a groove for accommodating a tablet computer, the tablet connection port is disposed in the groove and corresponds to an interface position of the tablet computer, the extension module is provided with an accommodating cavity which is internally provided with a PCB board and magnets for fixing the case body and a keyboard respectively by adsorption, the extension module is fixed with the case body and the keyboard respectively by adsorption of the magnets, a connection port is disposed on a lower side of the case body and is electrically connected to the tablet connection port, the PCB board comprises a first MCU chip, a second MCU chip, a tablet interface, a charging interface, an HDMI interface, a USB interface and a keyboard interface, the charging interface is electrically connected to an input end of the first MCU chip, the HDMI interface is electrically connected to an output end of the first MCU chip, the tablet connection port is electrically connected to the tablet interface through the connection port, the tablet interface is electrically connected to the first MCU chip and two-way transmission is enabled therebetween, the first MCU chip is electrically connected to the second MCU chip and two-way transmission is enabled therebetween through the USB interface, and the keyboard interface is electrically connected to the second MCU chip, and two-way transmission is enabled therebetween.

Further, the magnets are disposed on the lower side of the case body and an upper side and a lower side of the extension module respectively, the upper side of the extension module is fixed with the lower side of the case body by adsorption, the lower side of the extension module is fixed with an external keyboard by adsorption of the magnets, and the tablet interface is disposed on the upper side of the extension module.

Further, the PCB board further comprises a USB audio interface, an SD card control circuit, an SD card reading interface, a TF card control circuit and a TF card reading interface, wherein the USB audio interface is electrically connected to the second MCU chip and two-way transmission is enabled therebetween, the SD card reading interface is electrically connected to the second MCU chip and two-way transmission is enabled therebetween through the SD card control circuit, and the TF card reading interface is electrically connected to the second MCU chip and two-way transmission is enabled therebetween through the TF card control circuit.

The USB audio interface, the SD card reading interface and the TF card reading interface are disposed on a side of the extension module respectively, and the SD card reading interface and the TF card reading interface are further clamped with a detachable plastic cover on their surfaces.

Further, the model of the first MCU chip is EP9631G, and the model of the second MCU chip is GL3510.

Further, the tablet connection port is an intelligent touch interface, and the keyboard interface is a pogo pin interface.

The charging interface, the HDMI interface and the USB interface are disposed on a side of the extension module, and the magnets and the keyboard interface are disposed on a bottom side of the extension module.

Further, the case body is a plastic protective case, and a side of the protective case is further provided with a through hole corresponding to keys of the tablet computer.

Further, the back of the case body is further provided with a support frame, and an upper end of the support frame is hinged with the case body.

The back of the case body is further provided with a slot for receiving the support frame, and the shape of the slot corresponds to that of the support frame.

The present disclosure has the following beneficial effects:

1. The protective case with an electronic function according to the present disclosure provides the tablet with more extension functions, which can not only can protect a tablet computer but also add functions to the tablet computer, such as data transmission, power conversion and charging, thus enabling the tablet to have more diverse functions and bringing better user experience.

2. The extension module and the case body are fixed integrally by magnetic adsorption with no wires exposed, thus the protective case of the present disclosure is not only beautiful and easy to carry, but also easier and faster to use and more practical.

3. The extension module and the case body are detachably connected. When the external keyboard and the extension function are not needed, the extension module can be disassembled, making the use more flexible and convenient.

4. By installing the tablet computer in the protective case of the present disclosure, the tablet computer can be electrically connected to the tablet interface, and the user can use various interfaces of the extension module. Moreover, the protective case is further electrically connected to a corresponding external keyboard by magnetic adsorption, which is convenient to use and changes the tablet into a portable mini-laptop, which is especially suitable for mobile officing.

Figure 1:
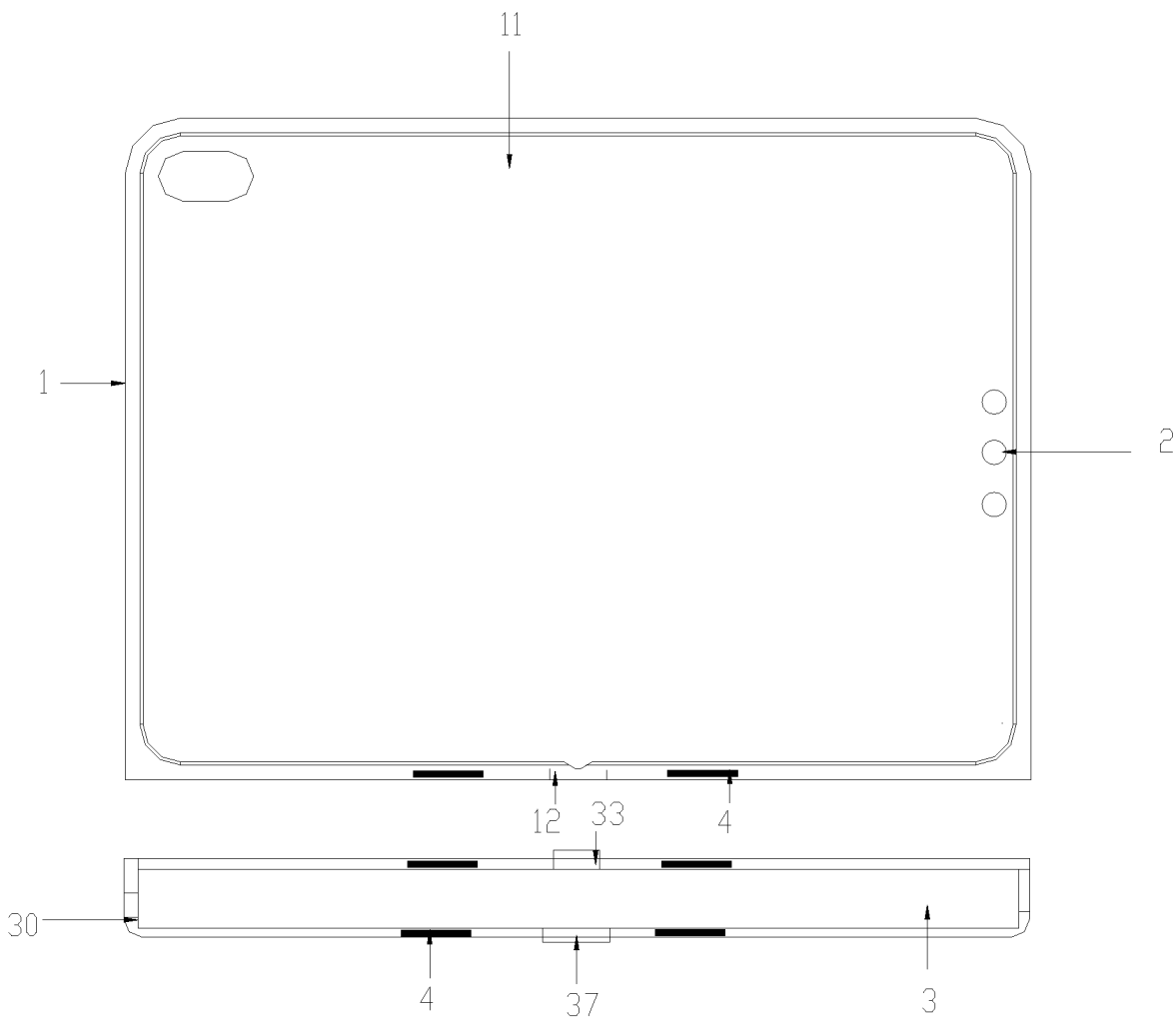
FIG. 1 is a schematic diagram of a dissembled structure of the present disclosure.
Figure 2:
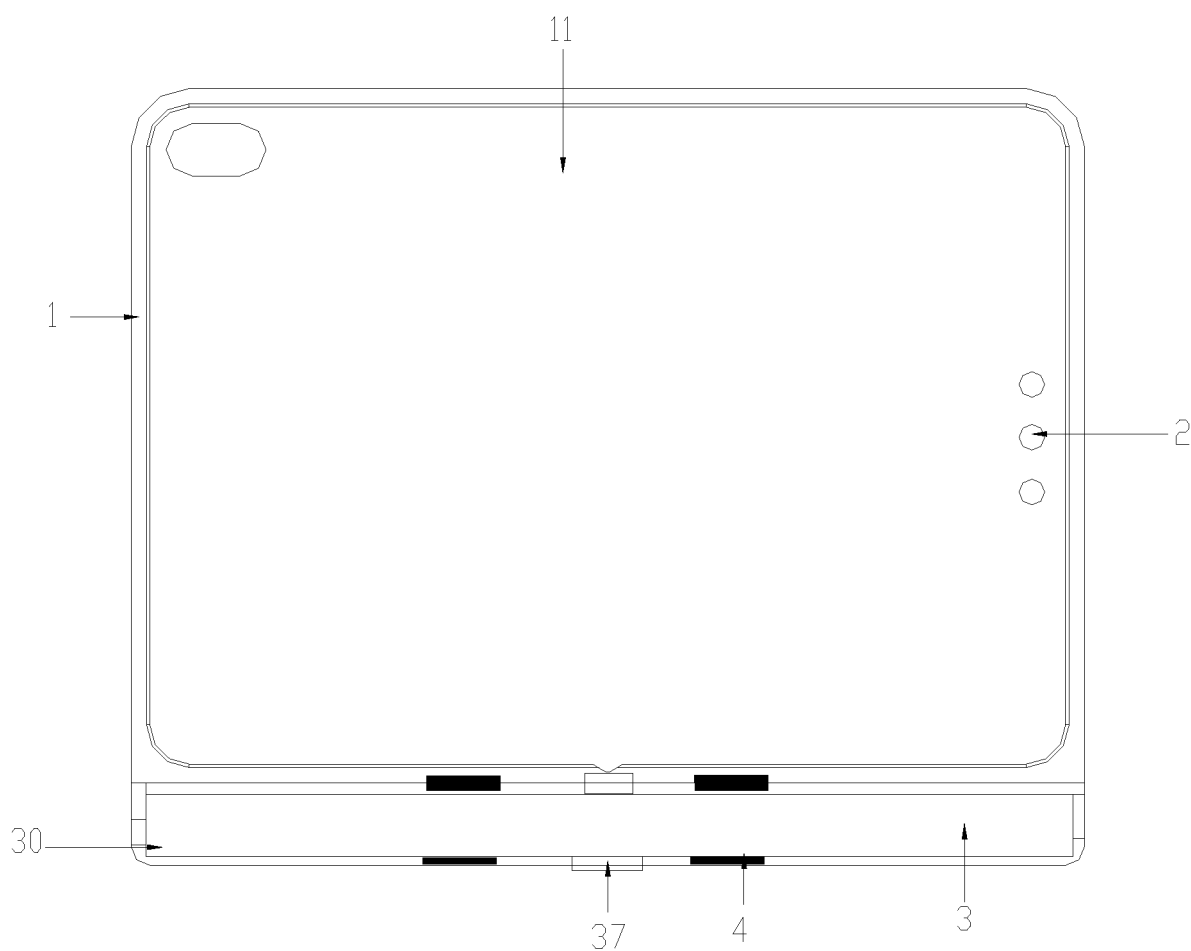
FIG. 2 is a schematic diagram of a combined result of the present disclosure.
Figure 3:
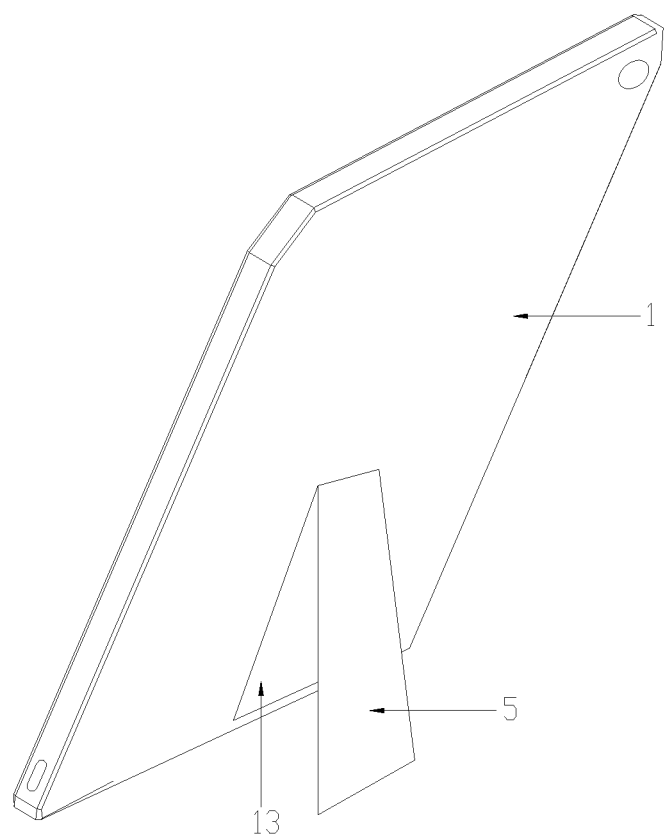
FIG. 3 is a three-dimensional rear view of the present disclosure.
Figure 4:
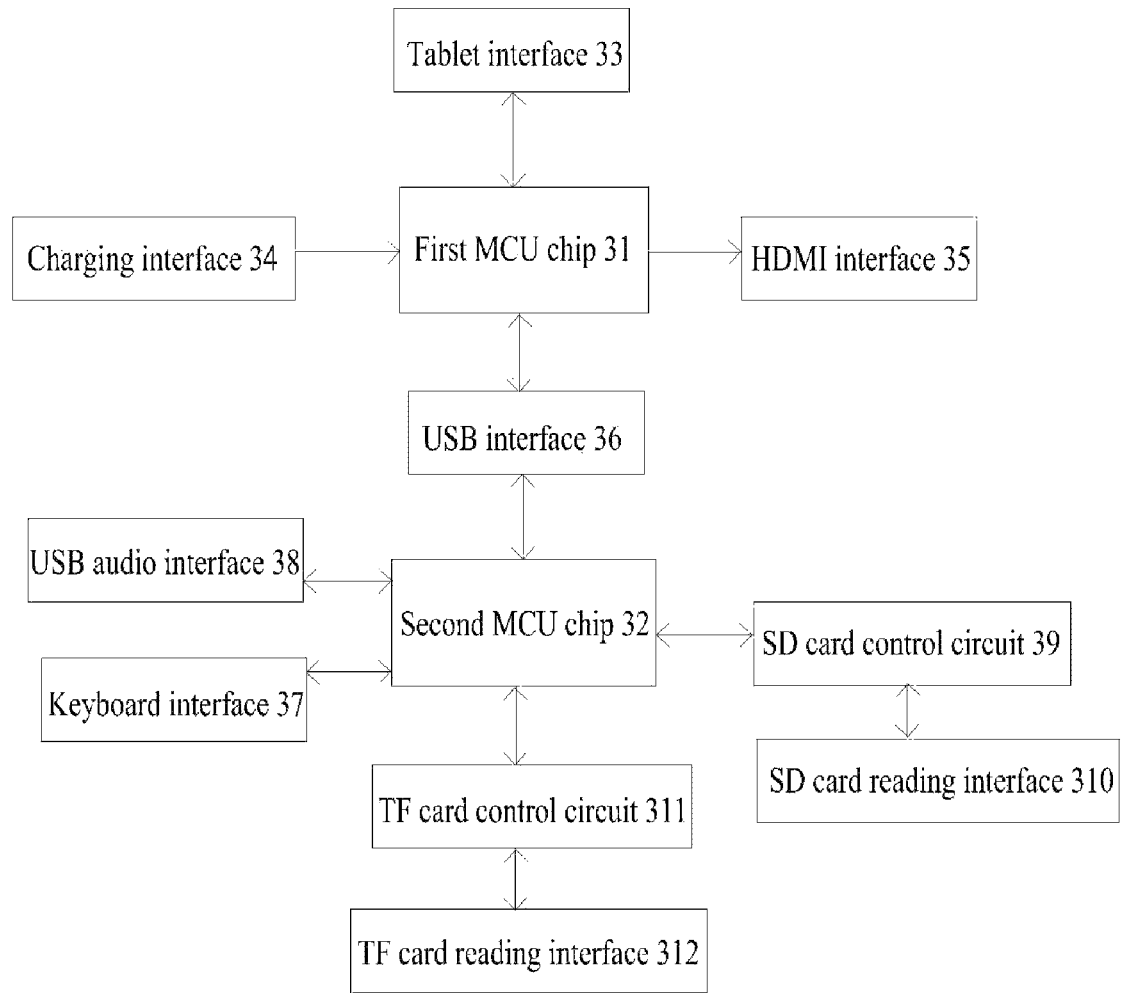
FIG. 4 is a circuit block diagram of an extension module of the present disclosure.

Descriptions about reference numerals: 1. case body; 11. groove; 12. connection port; 13. slot; 2. tablet connection port; 3. extension module; 30. accommodating cavity; 31. first MCU chip; 32. second MCU chip; 33. tablet interface; 34. charging interface; 35. HDMI interface; 36. USB interface; 37. keyboard interface; 38. USB audio interface; 39. SD card control circuit; 310. SD card reading interface; 311. TF card control circuit; 312. TF card reading interface; 4. magnet; 5. support frame.

DETAILED DESCRIPTION OF THE INVENTION

The utility model is described in further detail below with reference to specific implementations and accompanying drawings. This application can be implemented in many different forms and is not limited to the implementations described in this embodiment. The purpose of providing the following specific implementations is to facilitate a clearer and more thorough understanding of the contents disclosed in this application, where the words indicating the orientation such as up, down, left and right are only for the position of the shown structure in the corresponding accompanying drawings.

Referring to FIG. 1 to FIG. 4, the present disclosure relates to a protective case with an electronic function, including a case body 1, a tablet connection port 2 and an extension module 3. The case body 1 includes a groove 11 for accommodating a tablet computer. The tablet connection port 2 is disposed in the groove 11 and corresponds to an interface position of the tablet computer. The extension module 3 is provided with an accommodating cavity 30 which is internally provided with a PCB board and magnets 4 for fixing the case body 1 and a keyboard respectively by adsorption. The extension module 3 is fixed with the case body 1 and the keyboard respectively by adsorption of the magnets 4. The PCB board includes a first MCU chip 31, a second MCU chip 32, a tablet interface 33, a charging interface 34, an HDMI interface 35, a USB interface 36 and a keyboard interface 37. The charging interface 34 is electrically connected to an input end of the first MCU chip 31. The HDMI interface 35 is electrically connected to an output end of the first MCU chip 31. The tablet connection port 2 is electrically connected to the tablet interface 33. The tablet interface 33 is electrically connected to the first MCU chip 31 and two-way transmission is enabled therebetween. The first MCU chip 31 is electrically connected to the second MCU chip 32 and two-way transmission is enabled therebetween through the USB interface 36. The keyboard interface 37 is electrically connected to the second MCU chip 32 and two-way transmission is enabled therebetween. In this embodiment, the model of the first MCU chip 31 is EP9631G, and the model of the second MCU chip 32 is GL3510.

Referring to FIG. 1, the magnets 4 are disposed on the lower side of the case body 1 and an upper side and a lower side of the extension module 3, respectively. The upper side of the extension module 3 is fixed with the lower side of the case body 1 by adsorption. The lower side of the extension module 3 is fixed with an external keyboard by adsorption of the magnet 4. A connection port 12 is disposed on a lower side of the case body 1 and is electrically connected to the tablet connection port 2. The tablet interface 33 is disposed on the upper side of the extension module 3 and is electrically connected to the tablet connection port 2 through the connection port 12. The extension module 3 and the case body 1 are detachably connected. When the external keyboard and the extension function are not needed, the extension module 3 can be disassembled, making the use more flexible and convenient.

In this embodiment, the PCB board may further include a USB audio interface 38, an SD card control circuit 39, an SD card reading interface 310, a TF card control circuit 311 and a TF card reading interface 312. The USB audio interface 38 is electrically connected to the second MCU chip 32 and two-way transmission is enabled therebetween. The SD card reading interface 310 is electrically connected to the second MCU chip 32 and two-way transmission is enabled therebetween through the SD card control circuit 39. The TF card reading interface 312 is electrically connected to the second MCU chip 32 and two-way transmission is enabled therebetween through the TF card control circuit 311.

The USB audio interface 38, the SD card reading interface 310 and the TF card reading interface 312 are disposed on a side of the extension module 3, respectively. The SD card reading interface 310 and the TF card reading interface 312 are further clamped with a detachable plastic cover on their surfaces, which can better protect the interface against dust accumulation and can be pulled out when needing to be used. The PD charging interface 34, the HDMI interface 35 and the USB interface 36 are disposed on a side of the extension module 3. The magnets 4 and the keyboard interface 37 are disposed on a bottom side of the extension module 3 and are fixed with the corresponding external keyboard by magnetic adsorption, which is more convenient and quick. In this embodiment, there are two magnets 4.

In order to better match tablet computers with different models, the tablet connection port 2 is an intelligent touch interface, and the position and type of the tablet connection port 2 are designed according to the tablet computer with the corresponding model, such as a touch intelligent interface of an Apple tablet, which makes its application more widely. Besides, its connection wires are all embedded inside the case body 1 and will not be exposed. In this embodiment, the keyboard interface 37 is a pogo pin interface.

The case body 1 in this embodiment is a plastic protection case, and a through-hole and a camera hole corresponding to keys of the tablet computer are further disposed on a side of the case body 1. When the tablet computer is clamped in the case body 1, volume keys and control keys on a side of the tablet computer can be exposed to facilitate user control.

In this embodiment, the back of the case body 1 is further provided with a support frame 5, and an upper end of the support frame 5 is hinged with the case body 1. The back of the tablet computer is supported by the support frame 5, and a support angle of the support frame 5 can be adjusted to change a tilt angle of the tablet computer, making it easier to look directly at the screen of the tablet computer. The support frame 5 is a common support frame 5 in this field, which is not described in detail here. Besides, the back of the case body 1 is further provided with a slot 13 for receiving the support frame 5, and the shape of the slot 13 corresponds to that of the support frame 5. The use of the slot 13 is more convenient to receive the support frame 5, and also makes the whole protective case more beautiful and practical.

It should be further stated that unless otherwise specified and qualified, terms such as "connect," "fix" and "dispose" shall be understood in a broad sense, and the specific meanings of such terms in the present disclosure may be understood by a person of ordinary skill in the art according to specific circumstances.

The above implementations are only descriptions about preferred implementations of the present disclosure, but are not limitations to the scope of the present disclosure. Various transformations and improvements made by those of ordinary skill in the art without departing from the design spirit of the present disclosure should all fall into the protection scope defined by the claims of the present disclosure.

What is claimed is:

1. A protective case with an electronic function, comprising a case body, a tablet connection port and an extension module, wherein the case body comprises a groove for accommodating a tablet computer, the tablet connection port is disposed in the groove and corresponds to an interface position of the tablet computer, the extension module is provided with an accommodating cavity which is internally provided with a PCB board and magnets for fixing the case body and a keyboard respectively by adsorption, the extension module is fixed with the case body and the keyboard respectively by adsorption through the magnets, a connection port is disposed on a lower side of the case body and is electrically connected to the tablet connection port, the PCB board comprises a first MCU chip, a second MCU chip, a tablet interface, a charging interface, an HDMI interface, a USB interface and a keyboard interface, the charging interface is electrically connected to an input end of the first MCU chip, the HDMI interface is electrically connected to an output end of the first MCU chip, the tablet connection port is electrically connected to the tablet interface through the connection port, the tablet interface is electrically connected to the first MCU chip and two-way transmission is enabled therebetween, the first MCU chip is electrically connected to the second MCU chip and two-way transmission is enabled therebetween through the USB interface, and the keyboard interface is electrically connected to the second MCU chip and two-way transmission is enabled therebetween.

2. The protective case with an electronic function according to claim 1, wherein the magnets are disposed on the lower side of the case body and an upper side and a lower side of the extension module respectively, the upper side of the extension module is fixed with the lower side of the case body by adsorption, the lower side of the extension module is fixed with an external keyboard by adsorption through the magnet, and the tablet interface is disposed on the upper side of the extension module.

3. The protective case with an electronic function according to claim 1, wherein the PCB board further comprises a USB audio interface, an SD card control circuit, an SD card reading interface, a TF card control circuit and a TF card reading interface, the USB audio interface is electrically connected to the second MCU chip and two-way transmission is enabled therebetween, the SD card reading interface is electrically connected to the second MCU chip and two-way transmission is enabled therebetween through the SD card control circuit, and the TF card reading interface is electrically connected to the second MCU chip and two-way transmission is enabled therebetween through the TF card control circuit.

4. The protective case with an electronic function according to claim 3, wherein the USB audio interface, the SD card reading interface and the TF card reading interface are disposed on a side of the extension module respectively, and the SD card reading interface and the TF card reading interface are further clamped with a detachable plastic cover on their surfaces.

5. The protective case with an electronic function according to claim 1, wherein the model of the first MCU chip is EP9631G, and the model of the second MCU chip is GL3510.

6. The protective case with an electronic function according to claim 1, wherein the tablet connection port is an intelligent touch interface, and the keyboard interface is a pogo pin interface.

7. The protective case with an electronic function according to claim 1, wherein the charging interface, the HDMI interface and the USB interface are disposed on a side of the extension module, and the magnets and the keyboard interface are disposed on a bottom side of the extension module.

8. The protective case with an electronic function according to claim 1, wherein the case body is a plastic protective case, and a side of the protective case is further provided with a through hole corresponding to keys of the tablet computer.

9. The protective case with an electronic function according to claim 1, wherein the back of the case body is further provided with a support frame, and an upper end of the support frame is hinged with the case body.

10. The protective case with an electronic function according to claim 9, wherein the back of the case body is further provided with a slot for receiving the support frame, and the shape of the slot corresponds to that of the support frame.

* * * * *